(Model.)
2 Sheets—Sheet 1.
J. T. HART.
HAY RAKE AND LOADER.
No. 279,647.
Patented June 19, 1883.
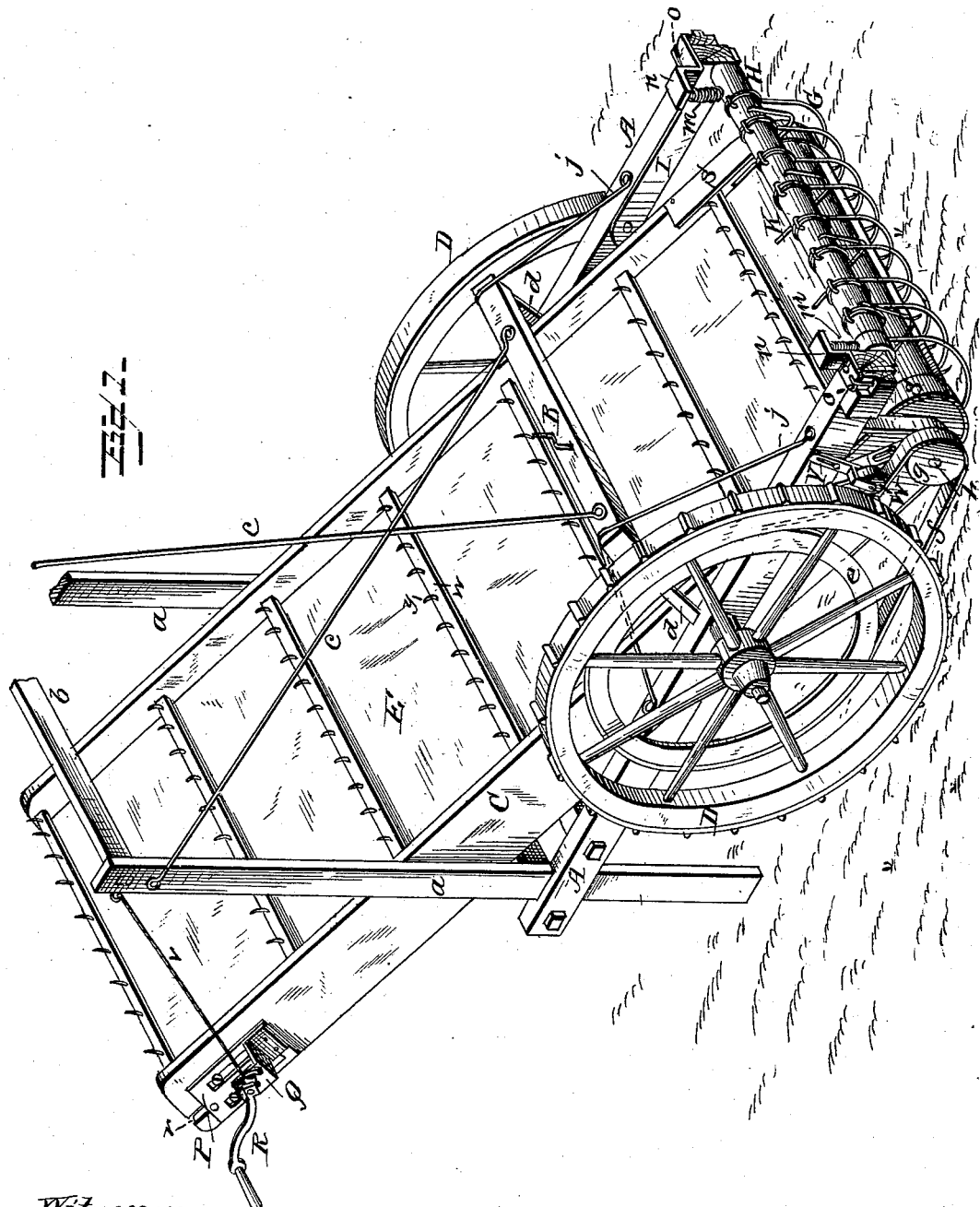
Witnesses:
F. L. Durand
Jn. G. Oliphant
Inventor:
Joel T. Hart
per Chas. H. Fowler
Attorney (Model.) 2 Sheets—Sheet 2.
J. T. HART.
HAY RAKE AND LOADER.
No. 279,647. Patented June 19, 1883.
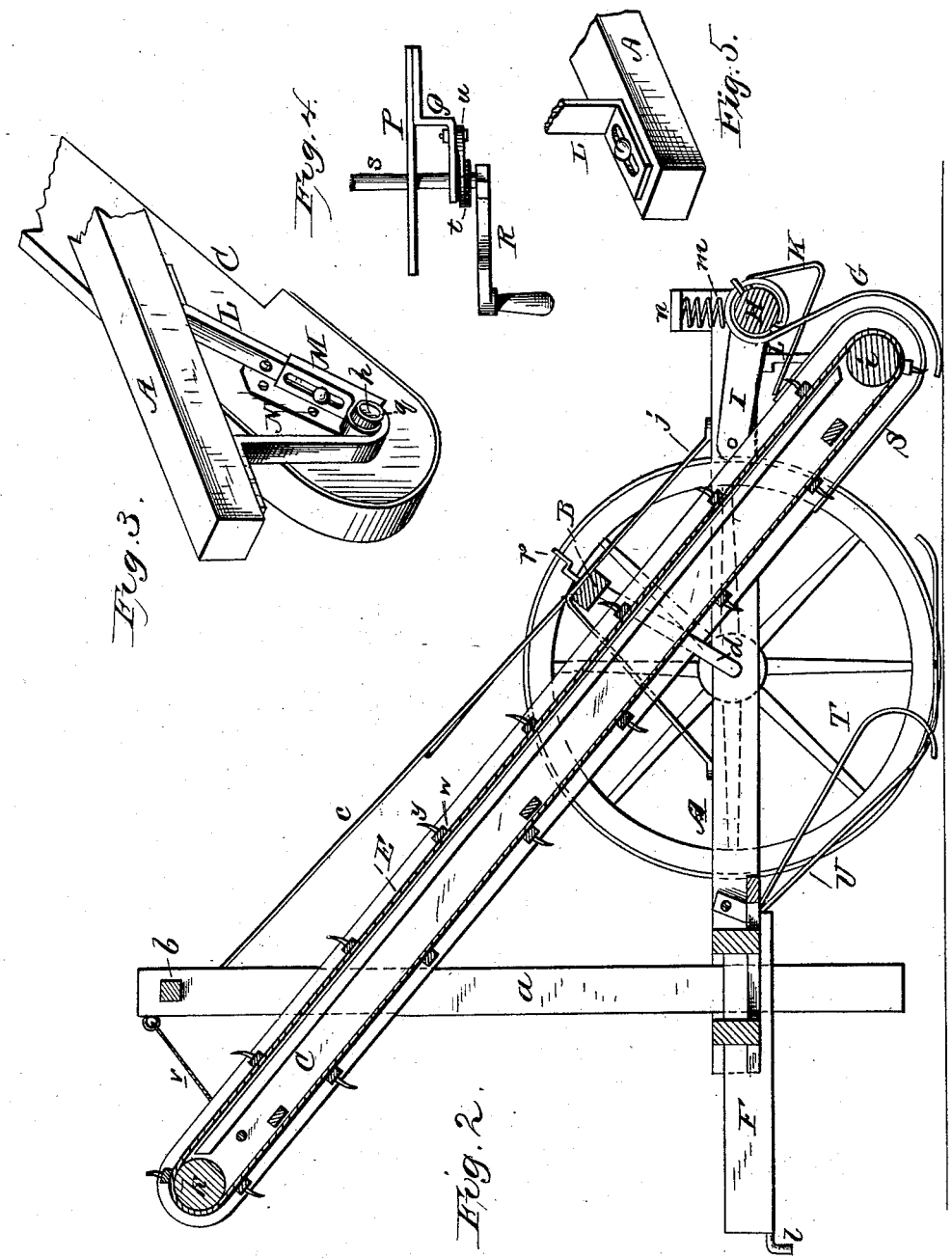
WITNESSES
F. L. Durand
N. E. Oliphant
INVENTOR
Joel T. Hart,
per Chas. H. Fowler
Attorney

UNITED STATES PATENT OFFICE.

JOEL T. HART, OF GREENWOOD, MISSOURI.

HAY RAKE AND LOADER.

SPECIFICATION forming part of Letters Patent No. 279,647, dated June 19, 1883.

Application filed December 30, 1882. (Model.)

*To all whom it may concern:*

Be it known that I, JOEL T. HART, a citizen of the United States, residing at Greenwood, in the county of Jackson and State of Missouri, have invented certain new and useful Improvements in a Hay Rake and Loader; and I do hereby declare that the following is a full, clear, and exact description of the same, reference being had to the annexed drawings, making a part of this specification, and to the letters and figures of reference marked thereon.

Figure 1 of the drawings is a perspective view of a hay rake and loader constructed in accordance with my invention; Fig. 2, a longitudinal section thereof; Fig. 3, a detail view, in perspective, of the end of the stationary frame, the carrier-frame, and adjustable hanger-bearing and box; Fig. 4, a similar view of the mechanism for tightening the carrier and elevating it; and Fig. 5, a detail view, in perspective, showing the means employed for rendering the hangers horizontally adjustable upon the under side of the frame of the machine.

The present invention has relation to certain new and useful improvements in combined hay rakes and loaders, and has for its object to improve their general construction and operation, whereby the several parts are readily adjusted, the machine evenly and perfectly balanced and readily handled by the attendant, and in every way superior to those machines in ordinary use. These objects I attain by the construction substantially as shown in the drawings and hereinafter described and claimed.

In the accompanying drawings, A represents the stationary frame, of any suitable form or construction, having at its forward end standards $a$, connected at their top by cross-brace $b$, rods $c$ being fastened to the outer sides of the standards and cross each other in a diagonal direction, and fastened at their lower ends to a cross-bar, B, connected to axle-arms $d$. These axle-arms extend up at an angle a sufficient distance above the carrier-frame C so that the cross-bar B will be directly over it, and a sufficient height above so as not to be in the way of the frame when it is being raised. The lower portion of the arms $d$ are bent at right angles in a horizontal direction, and form the axles which extend or pass through the sides of the stationary frame A. Upon these axles are loosely mounted wheels D, one of which is the drive-wheel, and has secured to its inner side a large skeleton pulley, $e$, over which passes a suitable chain or belt, $f$, from a smaller pulley, $g$, rigidly secured to a shaft, $h$.

To the shaft $h$ is secured a drum, $i$, over which passes the endless apron or carrier E, of the usual construction, the carrier at its opposite end passing over a drum, $b$. The drum $i$, if desired, may be provided with small wheels or pulleys to prevent the possibility of its turning on the shaft, the carrier operating in the usual manner to take the hay from the rake as fast as it is gathered, and carry it up onto the wagon, to which the machine is to be connected by means of the hook $l$ on the end of the short tongue F.

The rake-teeth G are coiled around the rake-head H, said head at its ends being secured to hangers I, pivoted to the interior sides of the frame A, thus allowing all the play up or down that is necessary, so that it will rake the hay clean on any ground, no matter how uneven it is, and the teeth having a double coil around the head renders them much stronger, and consequently more durable, and also possessing increased elasticity. Teeth K are also secured to the head H, and extend down and forward between the rake-teeth, and upward and over the carrier, so that the hay will not lodge against the head of the rake, and give ample room to raise the carrier at either end.

The carrier-frame C is supported at the rear end by adjustable hangers L, the horizontal portion of the hangers having elongated slots, so that they can be moved along the frame A, and held at the required position by suitable set-screws passing through the slots, as shown in Fig. 5. I do not, however, desire to confine myself to any particular means for rendering the hangers adjustable, as any well-known means may be employed so long as it will allow the proper adjustment of the hangers.

To the hangers L are secured adjustable bearings M for the ends of the shaft $h$, thus providing means for a horizontal and vertical adjustment, so that the carrier-frame may be either raised or lowered or moved backward or forward in order to convey any kind of crop of hay, either heavy or light, which is considered of great importance to prevent it from choking or clogging.

At the ends of the rake-head H, directly over it, are spiral springs m, which have a steady and even pressure, and hold the rake to the ground, so that there will be no possible chance to pass over and leave any hay, the spiral springs being secured at their upper end to brackets n, pivoted to the sides of the frame A, and held stationary by a suitable catch, o, so that the brackets can be swung around from over the rake-head to enable the rake-head to be turned up against the axle-bar B, and held there by attaching it to the spring-hook p, thus enabling the machine to be moved from place without the rake-teeth coming in contact with the ground.

It should be noticed that the carrier-frame C is so connected to the stationary frame A by the hangers and adjustable bearings heretofore referred to that it does not rest on the axle; consequently does not retard its movement.

Plates N are secured to the outer sides of the frame C, near its lower or rear end, and have circular boxes q, which enter the adjustable bearings M, the ends of the shaft h passing through the boxes and revolving therein.

At the upper or forward end of the carrier-frame C, and to the sides thereof, are adjustably secured bearing-plates P for the ends of the axle of the drum k, which pass through elongated slots r. This adjustment of the plates P enables the carrier to be tightened or loosened by moving the drum k either to or from the end of the frame C.

The frame C may be raised or lowered by the man standing on the wagon, who receives the hay, by taking hold of the crank R upon the end of a shaft or rod, s, which is provided with a ratchet-wheel, t, with which engages a pawl, u, pivoted to an angle-plate, Q. By turning the shaft s the cords or ropes v will be wound around the same, thus elevating the upper end of the carrier-frame, said cords or ropes being attached to the standards a. This adjustment of the frame C may be accomplished without getting down from the load, the ratchet-wheel and pawl holding the frame at any height desired.

To the lower end of the carrier-frame C are secured fenders S, to prevent the hay from wrapping on the shaft. A spring-tooth, T, and a spring-drag, U, are connected to the interior side of the frame A, which together separate the swath of hay, so that it will not hang on the rake and prevent the carrier from carrying it up on the wagon.

The frame A and axle or axle-arms d are made fast or securely connected together about midway of the length of the frame, and the peculiar construction of the axle-arms—that is to say, having them extend up from the sides of the frame—makes a completely-balanced machine which can be easily handled by one person and fastened to the wagon or unfastened, as found necessary. The advantages of a well-balanced machine will be readily appreciated, the short axles and upright axle-arms making a very short and compact machine, bringing the draft closer to the wagon and making it much lighter. The adjustment of the hangers L regulates the distance of the carrier from the rake and also from the ground, so that it will suit any kind of a swath of hay, also any ground, either rough or smooth, thus making a very handy and complete machine.

The crooked teeth y in the slats w are preferable to straight ones, as they receive the hay much better and let it off easier.

The axle-arms d and cross-bar B may be formed of one piece, if so preferred, and may be braced by rods j, the arms being inclined backward, so as to give the most room for the carrier to pass under it back to the rake.

If necessary, the carrier-frame may have a frame of slats or wires fastened on it from the axle upward, or along its forward end and a short distance beyond it; or instead of slats or wires a canvas may be stretched over the carrier-frame to prevent the wind from blowing the hay off.

A small roller, W, connected to an adjustable arm, Y, is for the purpose of tightening the chain or belt f, the roller being brought against it by the proper adjustment of the arm which is connected to the side of the frame A.

Having now fully described my invention, what I claim as new, and desire to secure by Letters Patent, is—

1. In a hay rake and loader, the combination of the adjustable frame C, carrier E, drum k, adjustable plates P, connected to the sides of the frame and forming bearings for the ends of the drum, the crank-shaft s, provided with the ratchet-wheel t, the bearing-plate Q, secured to one of said plates P, the pawl u, and mechanism connecting said shaft with the fixed frame, whereby the carrier is adjusted, substantially as and for the purpose set forth.

2. In a hay rake and loader, the combination of the stationary frame A, adjustable hanger L, adjustable bearings M, the adjustable frame C, the carrier E, and drum i, supported by the hangers, substantially as and for purpose specified.

3. In a hay rake and loader, the frame A, brackets n, and springs m, and the head H, teeth G K, and pivoted hangers I, constructed and arranged to operate substantially as and for the purpose set forth.

4. In a hay rake and loader, the rake-head H, connected to the pivoted hangers I, in combination with the pivoted or swinging brackets n, having connected thereto the springs m, substantially as and for the purpose described.

5. In a hay rake and loader, the combination of the frame C, the carrier E, and the fenders S, connected to the frame C and extending around the end thereof, as shown and described, and for the purpose specified.

6. In a hay rake and loader, the combination of the frame A a, the adjustable frame C, carrier E, the short axles provided with upwardly-extending arms d, the cross-bar B, and the brace-rods c j, substantially as and for the purpose set forth.

7. In a hay rake and loader, the combination, with the rake-head H, carrying the teeth G K, constructed and arranged as shown, of the spring-tooth T and spring-drag U, substantially as and for the purpose described.

8. In a hay rake and loader, the combination of the frame A, adjustable hangers L, adjustable bearings M, carrier E, frame C, and plates N, provided with the journal-boxes q, substantially as and for the purpose described.

In testimony that I claim the above I have hereunto subscribed my name in the presence of two witnesses.

JOEL T. HART.

Witnesses:
J. A. KIRKTON,
F. T. McCULLOUGH.